(12) United States Patent
Chapuis et al.

(10) Patent No.: US 12,535,380 B2
(45) Date of Patent: Jan. 27, 2026

(54) SYSTEM AND METHOD FOR DETECTING FAULTS IN EXTENDED WAVEGUIDES USING A NETWORK OF NODES

(71) Applicant: COMMISSARIAT A L'ENERGIE ATOMIQUE ET AUX ENERGIES ALTERNATIVES, Paris (FR)

(72) Inventors: Bastien Chapuis, Tresserve (FR); Julien Albertini, Paris (FR); Clément Fisher, Orsay (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 386 days.

(21) Appl. No.: 18/025,892

(22) PCT Filed: Sep. 10, 2021

(86) PCT No.: PCT/EP2021/074932
§ 371 (c)(1),
(2) Date: Mar. 11, 2023

(87) PCT Pub. No.: WO2022/053611
PCT Pub. Date: Mar. 17, 2022

(65) Prior Publication Data
US 2023/0349788 A1 Nov. 2, 2023

(30) Foreign Application Priority Data
Sep. 11, 2020 (FR) ........................................ 2009239

(51) Int. Cl.
*G01M 5/00* (2006.01)
*B61L 23/04* (2006.01)
*B61L 27/53* (2022.01)

(52) U.S. Cl.
CPC .......... *G01M 5/0066* (2013.01); *B61L 23/044* (2013.01); *B61L 23/045* (2013.01); *B61L 27/53* (2022.01); *G01M 5/0025* (2013.01)

(58) Field of Classification Search
CPC .... B61L 23/044; B61L 3/243; G01M 5/0066; G01N 29/2412; G01N 2291/2623; G01N 29/048; B06B 2201/54
(Continued)

(56) References Cited

U.S. PATENT DOCUMENTS 4,728,063 A * 3/1988 Petit ...................... B61L 23/044
246/34 CT
5,713,540 A * 2/1998 Gerszberg ................. B61L 1/06
73/645
(Continued)

FOREIGN PATENT DOCUMENTS

JP 2005331263 A * 12/2005
WO 2014/027977 A1 2/2014
(Continued)

OTHER PUBLICATIONS

English Translation of JP 2005331263 (Year: 2005).*
(Continued)

*Primary Examiner* — Tran M. Tran
(74) *Attorney, Agent, or Firm* — BakerHostetler

(57) ABSTRACT

Method and a device for detecting defects in an elongated structure able to act as an elastic-wave waveguide, the elongated structure being fitted with a plurality of transducers able to acquire measurement signals of characteristic quantities of elastic waves propagating in the elongated structure, each transducer being coupled to an electronic device, the set of electronic devices constituting a network of nodes configured to process measurement signals received from at least one transducer. The method is com-
(Continued)

puter-implemented and comprises steps of: performing a plurality of local defect diagnoses, based on measurement signals received by a plurality of electronic devices, the measurement signals being acquired for multiple elastic wave emission phases; transmitting, to a remote server in accordance with a low-energy-consumption communication protocol, messages containing information relating to each local diagnosis, the messages being formatted in accordance with the low-energy-consumption communication protocol; aggregating the information contained in the received messages; and performing a global defect diagnosis for determining the presence or absence of a defect in the elongated structure.

14 Claims, 6 Drawing Sheets

(58) Field of Classification Search
USPC .......................................................... 73/636
See application file for complete search history.

(56) References Cited

U.S. PATENT DOCUMENTS

| | | | | |
|---|---|---|---|---|
| 5,864,304 | A * | 1/1999 | Gerszberg | B61L 29/18 246/126 |
| 6,026,687 | A * | 2/2000 | Jury | G01H 13/00 73/579 |
| 6,715,354 | B2 * | 4/2004 | Wooh | G01N 29/42 73/598 |
| 6,779,761 | B2 * | 8/2004 | Holgate | B61L 23/044 324/217 |
| 6,895,362 | B2 * | 5/2005 | Davenport | G01V 1/001 701/19 |
| 6,951,132 | B2 * | 10/2005 | Davenport | B61L 1/06 73/598 |
| 7,017,864 | B2 * | 3/2006 | McAllister | B61L 1/188 246/34 R |
| 7,036,774 | B2 * | 5/2006 | Kane | B61L 23/047 246/167 R |
| 9,031,791 | B2 * | 5/2015 | Nedilko | B61L 23/041 702/56 |
| 9,417,215 | B2 * | 8/2016 | Cooper | G01N 29/4463 |
| 9,516,395 | B2 * | 12/2016 | Foster, III | H04Q 9/04 |
| 9,701,326 | B2 * | 7/2017 | Kull | B61L 23/044 |
| 9,989,498 | B2 * | 6/2018 | Lanza di Scalea | G01N 29/46 |
| 10,457,303 | B2 * | 10/2019 | Schmidt | G01H 11/00 |
| 10,473,624 | B2 * | 11/2019 | Philtron | G01N 29/14 |
| 10,663,437 | B2 * | 5/2020 | Cai | B06B 1/0603 |
| 10,908,130 | B2 * | 2/2021 | Pellegrino | H04W 4/70 |
| 11,237,136 | B2 * | 2/2022 | Shoji | G01N 29/041 |
| 11,460,450 | B2 * | 10/2022 | Druet | G01M 5/0066 |
| 11,572,088 | B2 * | 2/2023 | Asuka | B61L 27/53 |
| 11,623,672 | B2 * | 4/2023 | Aaroe | B61L 27/70 246/120 |
| 11,740,155 | B2 * | 8/2023 | Chapuis | G01N 29/2437 702/34 |
| 11,958,514 | B2 * | 4/2024 | Pertosa | B61L 23/044 |
| 12,084,098 | B2 * | 9/2024 | Mesnil | B61L 23/14 |
| 12,188,906 | B2 * | 1/2025 | Albertini | G01N 29/44 |
| 12,241,869 | B2 * | 3/2025 | Druet | G01N 29/223 |
| 2004/0172216 | A1 * | 9/2004 | Davenport | B61L 23/041 702/14 |
| 2005/0076716 | A1 * | 4/2005 | Turner | B61L 23/044 73/579 |
| 2007/0118335 | A1 * | 5/2007 | Andarawis | G01M 5/0066 702/188 |
| 2009/0301198 | A1 * | 12/2009 | Sohn | G01N 29/262 73/598 |
| 2010/0079258 | A1 * | 4/2010 | Ihn | G01N 29/2475 340/10.41 |
| 2014/0238139 | A1 * | 8/2014 | Loveday | G01N 29/34 702/56 |
| 2016/0075356 | A1 * | 3/2016 | Kull | B61L 23/044 246/121 |
| 2018/0327008 | A1 * | 11/2018 | Kindt | B61L 23/044 |
| 2023/0024577 | A1 * | 1/2023 | Albertini | G01N 29/043 |
| 2023/0325171 | A1 * | 10/2023 | Chapuis | G06F 8/65 717/172 |
| 2023/0333061 | A1 * | 10/2023 | Chapuis | B61L 23/045 |

FOREIGN PATENT DOCUMENTS

| | | | |
|---|---|---|---|
| WO | 2015/178868 | A1 | 11/2015 |
| WO | 2019/185872 | A1 | 10/2019 |

OTHER PUBLICATIONS

Burger, et al., "Large Scale Implementation of Guided Wave Based Broken Rail Monitoring", AIP Conference Proceedings 1650, pp. 771-776, 2015.
Loveday, et al., "Long range guided wave defect monitoring in rail track", AIP Conference Proceedings 1581, pp. 179-185, 2014.

* cited by examiner

SYSTEM AND METHOD FOR DETECTING FAULTS IN EXTENDED WAVEGUIDES USING A NETWORK OF NODES

CROSS-REFERENCE TO RELATED APPLICATIONS

This application is a National Stage of International patent application PCT/EP2021/074932, filed on Sep. 10, 2021, which claims priority to foreign French patent application No. FR 2009239, filed on Sep. 11, 2020, the disclosures of which are incorporated by reference in their entirety.

FIELD OF THE INVENTION

The invention relates to the field of the monitoring of structures through non-destructive testing, and relates in particular to the monitoring of structures comprising elongated waveguides.

BACKGROUND

In the railway sector, the rail is a critical elongated structure the integrity of which has to be monitored. Subject to very high thermomechanical forces (for example internal stresses due to hampered thermal expansion, trains passing), rail portions wear out over time and may sometimes be subject to clean breakages. The state of the tracks has to be monitored in order to reduce or even eliminate the risks of derailment. Maintaining a rail network represents a major challenge in terms of cost and safety for rail operators.

Multiple known approaches are implemented to monitor the integrity of rails.

Breakages are detected at present by an electrical system called a "track circuit", which consists in channeling a weak electric current in the rails. When a train enters a given portion, its axle short-circuits the two rails. This system thus makes it possible to ensure that the track is free, or that there is no carriage lost by a previous train, and therefore that the train is able to enter the track portion. Incidentally, this system is able to detect some rail breakages (when the electrical discontinuity is large enough), but not necessarily all damage suffered by rails during use. However, this approach exhibits limitations.

There are other approaches, notably on-board ones. Earlier defects, such as cracks, are detected using inspection devices, which are visual or based on sending signals (for example ultrasound, electromagnetic signals) and which are generally carried on board a maintenance train traveling on or along the tracks. For reasons of detection performance, this device cannot travel at commercial speeds, but much more slowly, this necessarily causing an inconvenience or even an interruption of traffic (night traffic). This type of approach exhibits numerous drawbacks. Given the number of kilometers of rail network to be inspected, a given network portion is statistically inspected insufficiently and there is a significant risk of rail breakage before the incipient breakage is detected. Moreover, these on-board techniques generally have access only to the surface of the rail, that is to say the upper part of the structure (called head). They do not cover the inspection of the middle and lower parts of the rail profile.

Another known approach for detecting defects in rails (for example breakage and incipient fracture) consists in placing, along the rail, transducers (which may be denoted as sensors) emitting guided elastic waves that propagate over long distances (typically 1 km), and which are connected to electronic devices (an electronic device is also denoted an "electronic node" in the sense of a "hub" pooling electronic resources), the set of electronic devices constituting a network of nodes configured to process measurement signals received from at least one transducer. The waves interact with the defects, and the signals diffracted by the analysis thereof make it possible to detect and locate them. This type of approach is described in some patent documents, notably US20140238139, WO2014027977A1 and WO2015178868A1, and certain scientific articles, for example in the article entitled "*Large Scale Implementation of Guided Wave Based Broken Rail Monitoring*". These technologies, and certain variants, are currently marketed. However, these approaches exhibit limitations. Although the detection of clean breakages is generally satisfactory, the detection of incipient defects, which is more difficult, remains insufficient, and the locations of defects are not precise. This technical problem is the subject of contemporary research.

Other known systems also based on the analysis of guided elastic waves are those operating in "pulse-echo" mode, making it possible to detect and locate a defect via the signal reflected by this defect. However, the measurement in pulse-echo mode alone is generally not sufficient to detect small defects (low reflection coefficients produce extremely weak and undetectable return signals). Furthermore, this type of approach does not make it possible to inspect the entire area located between two nodes for which the separation distance has been determined beforehand for the measurement in transmission mode. Moreover, this type of system cannot use the signals in transmission mode and in reflection mode at the same time to reinforce the diagnosis. Known pulse-echo systems have limited coverage, which remains confined close to the nodes of the network. In other words, small defects are impossible to detect in practice far from transducers with current technologies.

Current technologies are also characterized by a low or small working frequency (low frequency, long waves), in order to ensure propagation over the longest possible distances. For example, in order to establish synchronization between emitter and receiver, one marketed system known in the art uses an optical fiber deployed along the track, this fiber ensuring the transmission of a synchronization signal. However, with this type of system operating at a very low frequency, incipient breakages remain very difficult to detect. Moreover, the deployment of an optical fiber along a track is highly intrusive in that it is necessary to protect the fiber (with a special path) all along the track in order to prevent it from being damaged. This point remains a major weakness for this type of system and imposes burdensome deployment on a pre-existing railway installation, with a high deployment cost. Finally, the optical fiber creates a vulnerability that will lead to a complex maintenance device. In particular, in the event of failure and/or modification of the track (for example due to the addition of a fishplate), the addition or removal of nodes is an excessively tricky operation because the nodes are chained. It necessarily requires a wiring operation on the fiber. In addition, with the optical fiber being intrinsically fragile, it is unsuitable for use in challenging environments.

Therefore, in view of the limitations outlined, there is an industrial need for methods and systems that overcome the drawbacks of existing systems and that make it possible to detect defects such as wear, incipient breakages or clean breakages in elongated structures.

SUMMARY OF THE INVENTION

The present invention may be used for monitoring cables, pipes or any other elongated structure, that is to say which has a preferred direction, which is able to act as an elastic-wave waveguide, and for which the monitoring technique is based on analyzing guided elastic waves. Analyzing the propagation of the waves makes it possible to provide information about the integrity of the waveguide and therefore about the presence or absence of a defect.

Various industrial structures take the form of elongated elastic-wave waveguides: for example a rail in the railway sector or in gantry structures. A pipe carrying a fluid is also an elongated structure for which it may be critical to ensure integrity (notably in the oil or nuclear sectors). The invention may likewise be applied to the monitoring of cables, for example for passenger transport systems (cable car or the like).

One subject of the present invention is a device for detecting defects in an elongated waveguide, notably a railway track, based on the analysis of elastic waves. The device of the invention is compact and offers simplified deployment and maintenance.

Advantageously, the device is composed of separate elements allowing installation and updates of "plug-and-play" type. It is thus possible to add or remove one or more elements without consequently modifying the general installation. This type of modification may easily be carried out using software where by contrast the known systems are "chained", that is to say requiring tricky operations where applicable (for example on the optical fiber, in terms of radio routing, etc.). Advantageously, the deployment and maintenance costs of the device according to the invention are therefore significantly reduced compared to existing systems.

In one general implementation, the device of the invention comprises a set of electronic devices installed along a structure to be monitored, constituting a network of nodes configured to: emit and receive signals; control guided elastic wave transducers; process measurement signals received from at least one transducer; and communicate messages to a remote server in accordance with a low-energy-consumption communication protocol. The remote server is configured to: combine messages containing information about a local diagnosis carried out by electronic nodes; and carry out a global and precise defect diagnosis by aggregating the local diagnoses.

In one implementation, each node comprises an energy source, elastic wave emission means, elastic wave measurement means, storage means, signal processing means for detecting defects, low-energy-consumption communication means for communicating, via a matched antenna, to a remote server, an antenna for receiving GNSS (Global Navigation Satellite System) signals.

Advantageously, the present invention allows simplified deployment that saves energy during operation, that is to say not requiring an electrical network, limiting the size of batteries, and exhibiting low constraints in terms of telecommunications coverage. These advantages are obtained through the use of low-energy-consumption communication protocols such as for example the "LoRaWAN" protocol, LoRaWaN being the acronym for "Long Range Wide-area network". Other wide area networks with low energy consumption, generically defined using the term: "LPWAN" for "Low Power Wide Area Network", may be used.

Low-energy-consumption communication protocols use free radio frequencies, and they are then inexpensive in terms of deployment, and it is possible to deploy them on a site if no pre-existing network is available there, unlike 4G deployments.

As this type of low-energy-consumption communication protocol does not make it possible to communicate large files, the device of the present invention is configured such that defect detection algorithms are embedded in each electronic node in order to carry out a local diagnosis and to feed the result back to a remote server. Advantageously, the messages generated by the nodes may be limited to a few bits (that is to say provide YES/NO binary information indicating that the elongated waveguide is or is not damaged) or contain a few bytes (that is to say provide a slightly more elaborate message containing finer information, for example on a defect criticality level, a location, a type, etc.).

In one embodiment, a remote server recovers the messages originating from the nodes, in order to pool the local information fed back by each node, and refine the diagnosis in order to guarantee actual defects are detected and limit false positives.

Advantageously, the embodiments of the invention allow each node to locally carry out a local defect diagnosis and to transmit, to a remote server using a low-energy-consumption communication protocol, simplified information about the state of health of the node and a portion of the elongated waveguide reduced to a few nodes. After analysis and processing, at the level of the server (or by a supervisor module), of all the basic information received, the method of the invention makes it possible to determine the presence of a probable defect, be this a clean break, an incipient breakage or wear, and makes it possible to make a decision accordingly (for example stop traffic on a railway track, schedule maintenance, etc.).

Advantageously, the embodiments of the invention make it possible to detect and locate incipient breakages (for example cracks), making it possible to anticipate a future fracture and schedule maintenance operations (repair/replacement of the damaged area) or perform monitoring over time. It is thus possible to avoid stopping traffic, which is detrimental for users.

Advantageously, and in contrast to current technologies, the embodiments of the invention make it possible, in the railway sector, to detect incipient breakages on the head and on the web of the rail through the concomitant use of the signals in pulse-echo mode and in transmission mode.

To obtain the desired results, what is proposed is a method for detecting defects in an elongated structure able to act as an elastic-wave waveguide, the structure being fitted with a plurality of transducers able to acquire measurement signals of characteristic quantities of elastic waves propagating in said elongated structure, each transducer being coupled to an electronic device, the set of electronic devices constituting a network of nodes configured to process measurement signals received from at least one transducer, the method being computer-implemented and comprising the following steps:

performing a plurality of local defect diagnoses, based on measurement signals received by a plurality of electronic devices, said measurement signals being acquired for multiple elastic wave emission phases;

transmitting, to a remote server in accordance with a low-energy-consumption communication protocol, messages containing information relating to each local diagnosis, said messages being formatted in accordance with said low-energy-consumption communication protocol;

aggregating the information contained in said received messages; and performing a global defect diagnosis for determining the presence or absence of a defect in said elongated structure.

According to some alternative or combined embodiments:

each electronic device comprises a signal processing circuit, and the step of performing a plurality of local diagnoses consists in each signal processing circuit implementing a defect detection algorithm in order to generate a local diagnosis;

the transmission step consists in transmitting messages between the plurality of electronic devices and the remote server in accordance with an LPWAN protocol;

the transmission step consists in transmitting messages in the LoRa format in accordance with a LoRaWan communication protocol;

the transmission step consists in transmitting messages containing at least one binary information item on the presence or absence of a defect;

the aggregation step comprises steps of:

creating group frames, a group grouping together n nodes and being composed of an emitter node and n−1 receiver nodes, a group frame having a number n+1 of bits, the value of n−1 bits corresponding to local diagnostic information received from a receiver node, and the value of two bits corresponding to left and right pulse-echo local diagnostic information received from the emitter node; and computing, for each group frame and for each phase, a position for each node as an emitter node position or a receiver node position;

the method additionally comprises a step of correcting the content of certain group frames;

the step of performing a global defect diagnosis consists, based on the corrected or non-corrected group frames and on the positions of the nodes in each group, in generating a global diagnosis result that lists, for each group of nodes in each phase, a value representative of the state of each node of the group for each phase, making it possible to determine whether the node is healthy or defective or whether it raises an exception;

the method additionally comprises a step of determining the location or the severity of a defect in the event of the presence of a defect being determined.

the method additionally comprises a step of displaying the result of the global defect diagnosis.

The invention also covers a computer program product comprising non-volatile code instructions for performing the steps of the method of the invention when the program is executed on a computer.

The invention additionally covers a device for detecting defects in an elongated structure able to act as an elastic-wave waveguide, the elongated structure being fitted with a plurality of transducers able to acquire measurement signals of characteristic quantities of elastic waves propagating in said elongated structure, each transducer being coupled to an electronic device, the set of electronic devices constituting a network of nodes configured to process measurement signals received from at least one transducer, the defect detection device comprising means for implementing the steps of the method of the invention.

In one embodiment, the electronic device comprises at least: an energy source; an elastic wave measurement circuit; an elastic wave emission circuit; storage components; a signal processing circuit; a wireless communication circuit coupled to an antenna in order to send messages in accordance with a low-energy-consumption communication protocol; a GNSS receiver.

The invention also covers a system for monitoring the state of railway tracks based on the analysis of elastic waves guided in the rails, the system comprising a plurality of defect detection devices according to the invention.

BRIEF DESCRIPTION OF THE DRAWINGS

Other features and advantages of the invention will become apparent with the aid of the following description and the figures of the appended drawings, in which.

DETAILED DESCRIPTION

Figure 1:
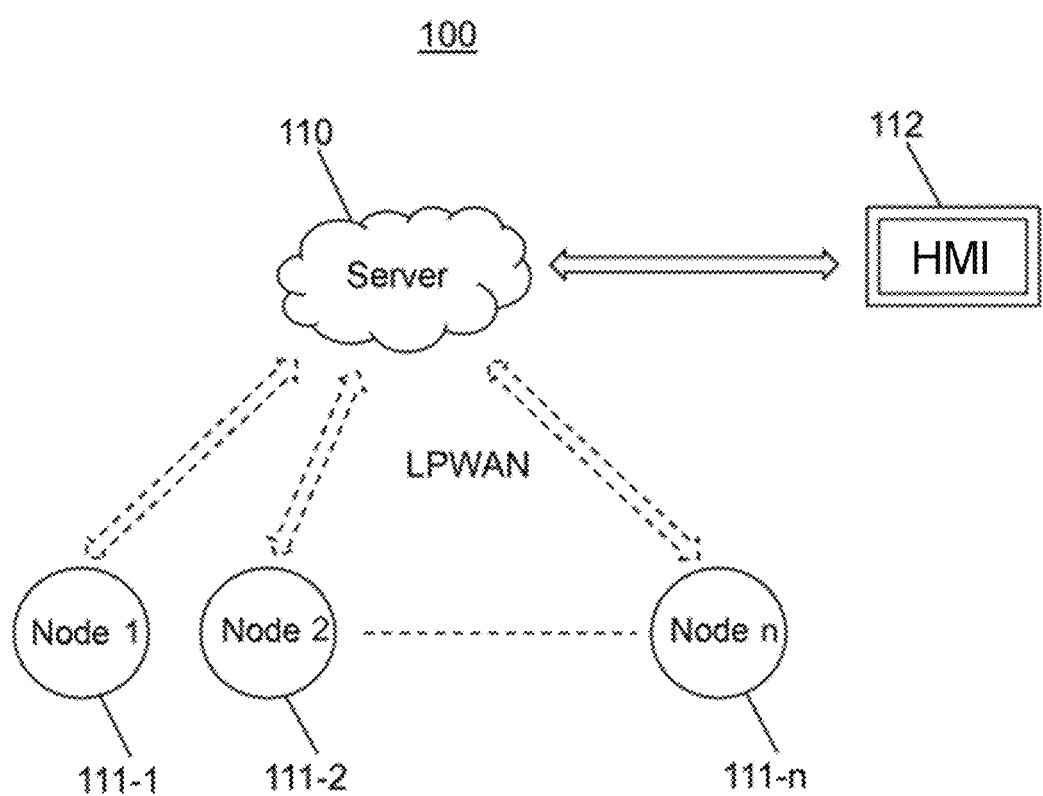
FIG. 1 illustrates one example of a general architecture for implementing the device according to the invention.

FIG. 1 illustrates a general architecture 100 of the main components of the system of the invention grouping together a plurality of electronic nodes (111-1 to 111-$n$) configured to implement the principles of the invention, and able to communicate with a remote server 110 through wireless communication means configured to emit and receive signals in accordance with a low-energy-consumption communication protocol such as an LPWAN protocol. A person skilled in the art will be able to adapt the principles of the present invention to various low-energy-consumption protocols, such as the LoRaWAN protocol. Hereinafter, "LoRa" will be used to denote the communication (protocol, technology, message format) between the nodes and the remote server. The system of the invention additionally comprises means 112 coupled (that is to say coupling to the Internet through ADSL, fiber, etc.) to the remote server 110, making it possible to recover data from the electronic nodes received by the server in order to display results to an end user on a Human-Machine Interface (HMI).

Using a LoRa communication mode makes it possible to transmit only a small amount of data. Given the limitations of LoRa communications, the nodes cannot make any decisions with full knowledge of the system. Therefore, the electronic nodes carry out processing on the raw signals received (emanating from elastic waves), which makes it possible to extract relevant information in order to transmit only this relevant information to the server. Thus, according to the principles of the invention, each node carries out local analysis based on its local knowledge, and in particular based on its own state, on the knowledge of the emitter node and on the measured signals. However, such a local diagnosis may lead to various cases of false positives, for example, if an emitter node is defective during emission, its neighboring receiver node will not receive any signal and will consider that the elongated waveguide is broken. Therefore, to limit these cases, according to the principles of the invention, a global diagnosis is carried out at a level having knowledge of the state of the complete system, allowing a reliable decision. The remote server 110, through the feedback of information from the plurality of electronic nodes, has the level of global knowledge of the system that allows the global diagnosis to be performed.

In one embodiment, the remote server 110 is configured as an application programming interface (API) implemented by a software library that allows communication with the electronic nodes in order to recover/receive the results of the acquisitions of the nodes, on the one hand, and to transmit a few specific instructions thereto, on the other hand.

The global decision making may take place at the level of the server or at the level of the HMI, which then comprises means for processing the information from the server. In one variant, the global decision making may be divided into pre-processing at the level of the server 110 and post-processing at the level of the HMI 112.

Figure 2:
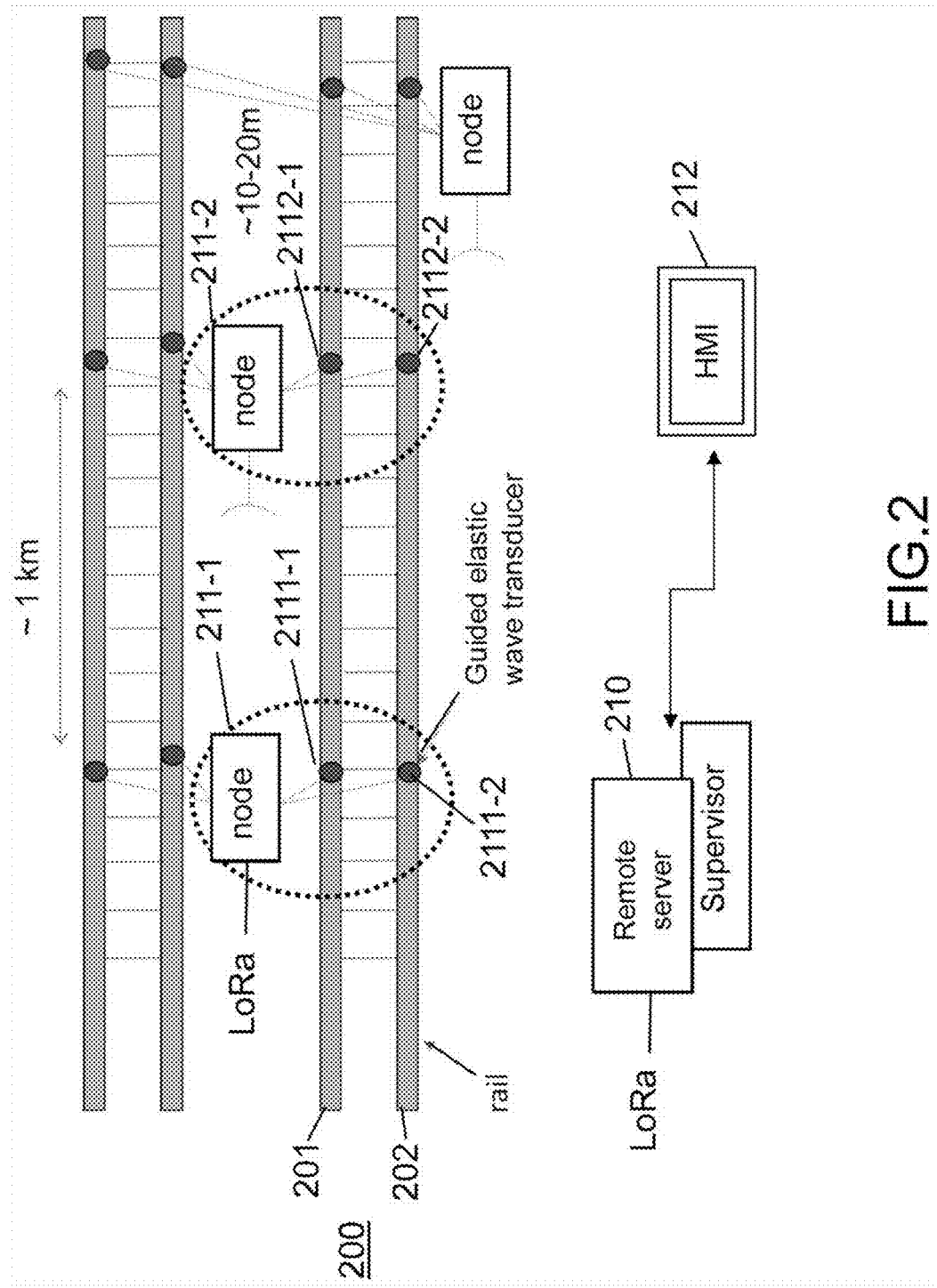
FIG. 2 illustrates one exemplary implementation of the device of the invention for a railway application.

FIG. 2 illustrates one exemplary implementation of the device of the invention for a railway application. However, this example is non-limiting and a person skilled in the art will be able to adapt the described implementation to any other application implementing an elongated structure able to act as an elastic-wave waveguide. In the described example, the waveguide is a rail.

FIG. 2 shows nodes 211-1, 211-2 deployed along a railway track 200, communicating with a remote server 210 in order to send local diagnostic information in accordance with a LoRa protocol. A person skilled in the art will understand that the example is taken in order to describe the principles of the invention but is non-limiting with regard to the number of nodes able to be deployed and to the distance between the nodes. In one implementation, a plurality of electronic nodes are installed along the track, typically one every kilometer.

One or each node controls, that is to say is in communication with, one or more transducers (2111-1, 2111-2), emits and/or receives signals, and communicates with a remote server 210 connected to a control station 212 for controlling the travel of trains, making it possible to send an alert in the event of a serious defect identified on a rail.

If a more minor defect is detected, the information is fed back to a maintenance center or to the control station 212 in order to track the progress of the severity and schedule repair or replacement of the rail.

Elastic wave transducers are arranged on each rail of the track. The term "on" denotes one or more locations selected from: under the head, be this on the inner web of the rail and/or on the outer web of the rail, under the rail. In the illustrated example, two transducers (2111-1, 2111-2) are arranged on two rails 201, 202, respectively, close to the first node 211-1, and two transducers (2112-1, 2112-2) are arranged on the two rails 201, 202, respectively, close to the second node 211-2. Although not described, some transducers may be arranged on the rails of a second railway track for train traffic in the other direction, these transducers being able to be coupled to the same electronic nodes as the first railway track.

A transducer is a device that converts one physical signal into another. There are a wide variety of transducers. In order to generate and receive acoustoelastic waves that are transmitted through a material (a rail, a tube, a structure, etc.), using an electromagnetic-acoustic transducer (EMAT) may constitute an alternative to using a piezoelectric transducer (PZT).

A transducer may be placed or fixed under the head of the rail. The advantage of positioning close to the head lies in the fact that the propagation takes place over a greater distance than in the web. A transducer may be affixed to the rail (for example an EMAT sensor that does not require any adhesive), adhesively bonded temporarily (for example a PZT sensor) or permanently to the rail (rail fitted ex-factory or in situ).

In one variant, a transducer may be placed or fixed on the inner and/or outer web of the rail. The transducers may be placed on both sides of the web of the rail, on the inner face or on the outer face. Nevertheless, due to the existence of rail-road vehicles, which have wheels encroaching on the outer side, it may be advantageous to place or fix the transducers on the inner face. The advantage of positioning on the inner wall of the web of the rail lies in the fact that external attacks are less likely than external ones. Nevertheless, the positions of the transducers may be variable (either temporarily or permanently). For example, certain areas (for example high-speed areas, bends, tunnel entrance, etc.) may be densely fitted out.

One advantageous embodiment consists in using removable transducers, which may for example be removed during maintenance operations.

The characterization of one or more defects may be obtained by varying one or more positions of the transducers and/or by selecting certain transducers from among the plurality of available transducers.

Figure 3:
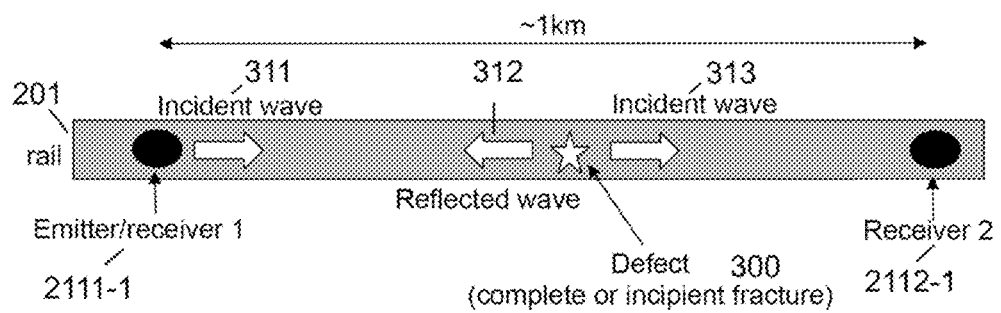
FIG. 3 illustrates various types of waves propagating between two transducers.

FIG. 3 illustrates various types of waves propagating between two transducers 2111-1 and 2112-1. Each transducer may operate simultaneously as an emitter and as a receiver. Multiple signals may then be used, these signals corresponding to: a wave 311, 313 transmitted from the emitter 2111-1 to the receiver 2112-1 and vice versa, as well as a wave 312 reflected when an emitter 2111-1 (or 2112-1) is operating in pulse-echo mode (the same transducer playing the role of emitter and of receiver).

The acoustoelastic field denotes the field of mechanical waves (sound, ultrasound, etc.) that propagate in a solid medium. Unlike the case of fluid, there are two types of acoustic waves for a solid material. These waves are better known by the name elastic waves (shear and compression-traction).

The presence and/or the absence of a transmitted and/or reflected wave provides information about the local presence or absence of a defect.

The absence of a transmitted wave provides information about a complete (or at least very severe) fracture of the rail between two transducers 2111-1 and 2112-1, but does not provide information about the location of the fracture. The time of flight of the reflected wave allows precise location of the breakage, the diagnosis being possibly reinforced by the reflected wave emitted by a transducer located on the other rail (for example 2112-2).

In the event of a defect less severe than a complete fracture of the rail (incipient breakage or a crack for example), the transmitted wave 313 makes it possible to detect and possibly locate a defect 300 or even to characterize it (estimate its severity), but this requires knowing precisely the time of flight of the wave. Given the propagation speeds involved (typically 3000 m/s), the receiver of a node needs to know precisely the emission peak of the wave in order to compute the signal observation window and measure the time of flight. The synchronization between emitter and receiver should generally be less than a microsecond. The measurements are performed substantially simultaneously by the transducers: the synchronization may be pre-arranged (arranged by circuits positioned along the track) or post-synchronized (by a time offset). In both cases, a very precise clock is advantageously implemented.

In one embodiment, the elastic waves follow (or come from) various propagation paths in the rail, and the measurements are performed in pulse-echo mode, or in transmission mode, from transducers placed on the web of the rail and/or under the head of the rail.

Figure 4:
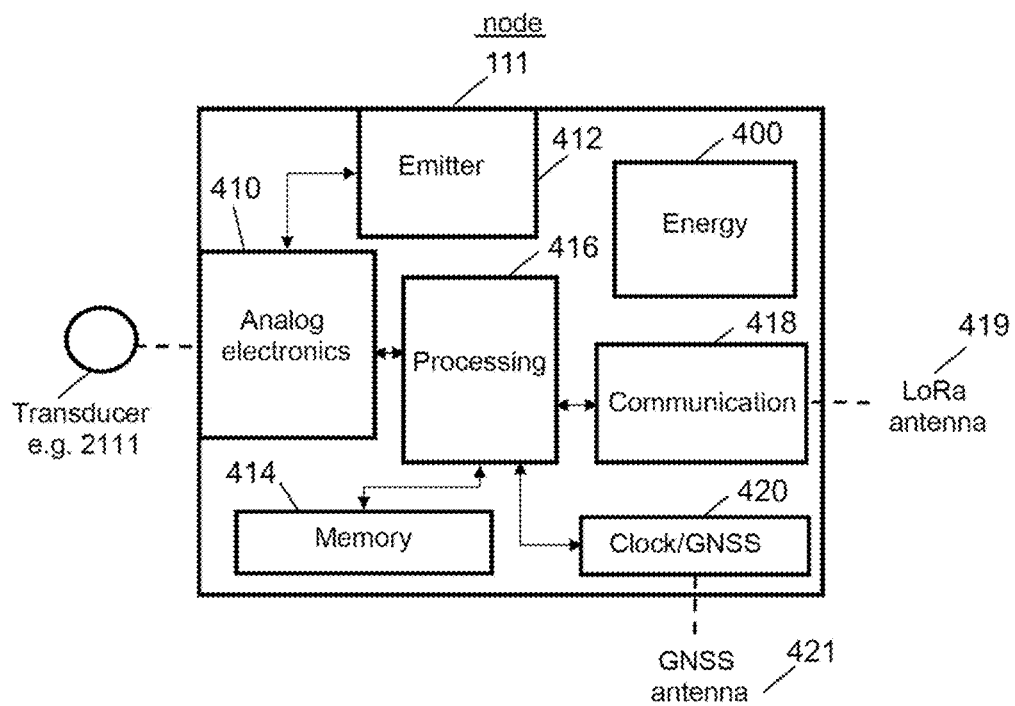
FIG. 4 illustrates one example of a structure of an electronic node according to the invention for carrying out a local diagnosis.

FIG. 4 illustrates one example of a structure of an electronic node 111 according to the invention for carrying out a local diagnosis.

Generally, a node 111 comprises: an energy source 400 (for example electric power supply such as a battery or solar panels, access to an external power supply, etc.); an electronic circuit comprising an elastic wave measurement circuit 410; an elastic wave emission circuit 412; storage components 414; a signal processing circuit 416 (FPGA, CPU or the like for processing the received signals); a wireless communication circuit 418 (for example LoRa) coupled to an appropriate antenna 419 for sending messages in accordance with a low-energy-consumption communication protocol; a GNSS receiver 420, for example of GPS type, including an antenna circuit 421 and the embedded electronics.

A node is coupled to at least one guided elastic wave transducer (for example 2111), which is for example installed on a rail close to the node.

The computing or signal processing circuit 416 is associated with computing and/or memory resources 414.

The energy source 400 may be provided by dynamo systems recharged by the passing of trains over the railway track and/or by one or more photovoltaic panels and/or by one or more wind turbines.

The GNSS circuit 420 may be shared between multiple nodes. A satellite positioning system, referred to as a GNSS (Global Navigation Satellite System), is based on a constellation of artificial satellites for providing, to a user or a circuit (via a portable receiver), its position, its speed and the time. In one embodiment, the GNSS circuits are associated with the transducers so as to precisely timestamp the signals measured by the transducers, while at the same time guaranteeing synchronization of under a microsecond between two nodes that are several kilometers apart (the distance does not matter as long as there is GNSS coverage on the two nodes under consideration).

In certain embodiments, the timestamping circuits and/or the computing circuits and/or the GNSS circuits may be variously distributed in space (for example the existence of centers, a fully distributed system, a hierarchical arrangement between nodes).

The signal processing circuit 416 embedded in each node makes it possible, based on the signals emanating from the elastic waves received from the nearby neighboring nodes, to carry out a local diagnosis, relating to the local presence or absence of a defect. The local computing circuit 416 is configured to determine or detect the existence of one or more local defects over a length of rail including a few transducers, based on synchronized measurements of the elastic waves propagating in the rail.

A local defect may be determined—its existence, its location, its category—by applying predefined thresholds, said predefined thresholds being determined with reference to an actual state, for example with respect to a state of the rail that is known to be healthy or with respect to a calibrated state of said rail, or with reference to a simulated state of the rail.

A defect may be characterized, notably regarding its nature, size, orientation in space or geometry, through amplitude and/or frequency analysis and/or through analysis of the shape of the signal and/or through analysis of the frequency spectrum of the measurement signals and/or of the function representative of the impulse response of the rail and/or through identification of a change in the mode of propagation of at least one of the waves propagating through the rail.

A defect may notably be oriented horizontally or vertically. Based on the signal analysis, the position and the size may be estimated. Through learning or through comparison with abacuses extracted from mathematical or numerical models, quantitative characterization may make it possible to determine a type of defect (corrosion, crack, discontinuity, etc.).

A defect may be characterized through differentiated diagnosis between the received signal being transmitted via the head of the rail and the one being transmitted via the web of the rail. For example, if the signal is transmitted to one end of the rail and not the other, it is possible to approximately determine the extent of the defect as well as its position in the section of the rail. In the event that no signal is transmitted, it is likely that the fracture of the rail is almost complete. In order to mitigate diagnosis uncertainties, the device of the invention advantageously makes it possible to feed back all the local diagnoses to a supervisor (analysis module of a remote server), which aggregates all of the information in order to allow a global diagnosis and precise defect characterization.

With each node having only partial information about the global system, the local and simplified diagnosis carried out by a node is transmitted to the remote server in order to improve the diagnosis. Specifically, when a node does not receive a signal, it considers that there is a rail fracture, whereas this may stem from the lack of emission of the signal by the emitter. Therefore, the server that aggregates the information received from the nodes will determine the state of said emitter node. The analysis carried out at the level of the remote server thus makes it possible to fine-tune the defect detection and bring about better decisions.

Various scenarios for transmitting local information received by each node to the remote server are possible, allowing more or less communication throughout the day. One implementation choice may be that of having messages that are as short as possible, containing only binary information about the state of health of each segment (for example, '0' for 'healthy' and '1' for 'damaged'). More complete messages containing additional information such as the criticality or the position of the defect may also be transmitted, at lower frequencies.

Figure 5:
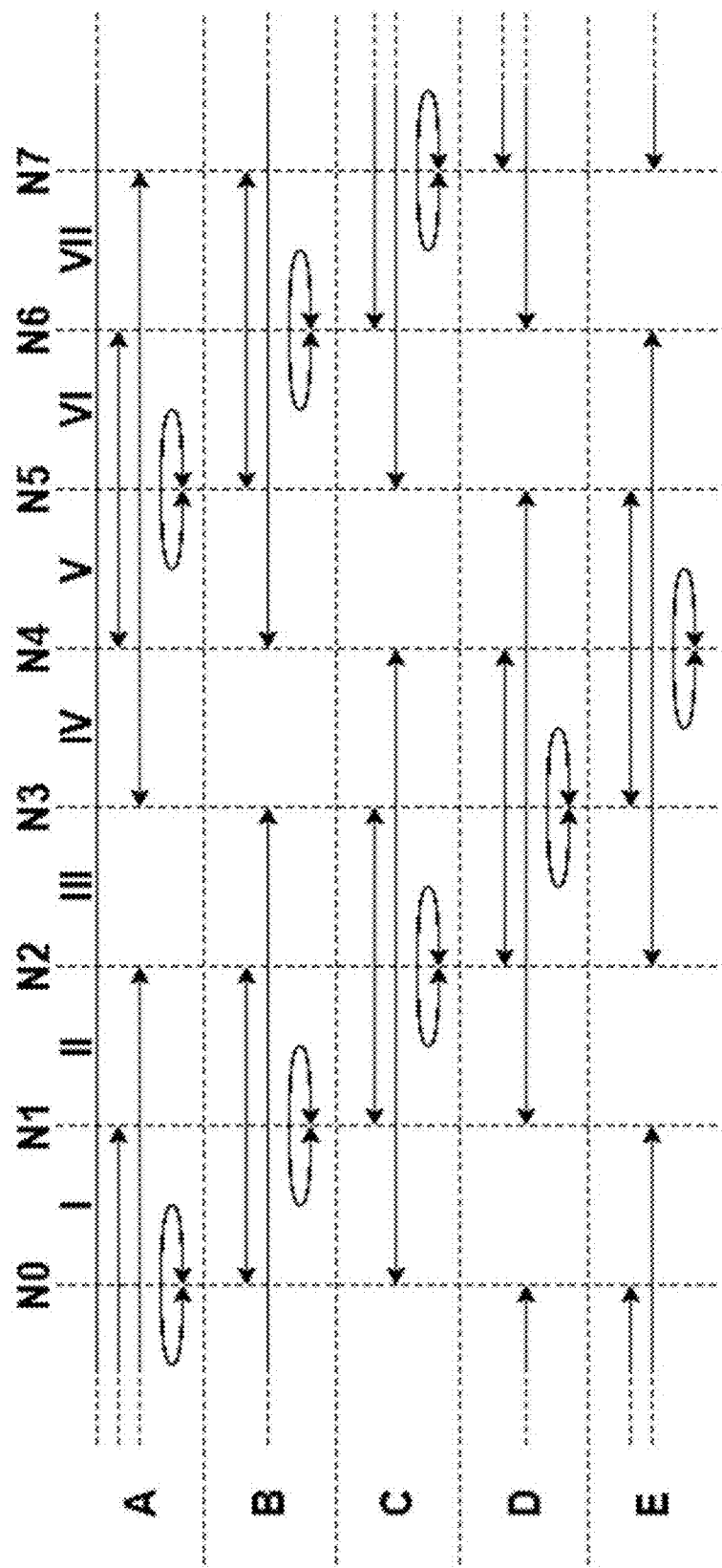
FIG. 5 illustrates a firing sequence allowing LoRa messages to be processed by the remote server.

FIG. 5 illustrates a firing sequence allowing LoRa messages to be processed by the remote server.

In the example of FIG. 5, five phases A, B, C, D, E are illustrated to cover a complete firing sequence (that is to say signal emission sequence). In this example, which is simplified to facilitate the description but which is non-limiting, it is assumed that, in each phase (A to E), each node carries out an action (emission or reception of a signal), one node out of five is an emitter (in order to avoid any signal overlap), and a signal emitted by an emitter node is received on its left by its two close left neighbors and on its right by its two close right neighbors. This mode of operation allows significant redundancy of the data, since each section between two nodes is tested 4 times out of 5. Thus, even in the event of failure of certain nodes, the area remains inspected.

For complete inspection of a track, a person skilled in the art will understand that it is necessary to duplicate the sequences in order to test the head and the web of the rail separately.

For the sake of simplifying the description, the information that is fed back from a node to the server is limited to the sole information on the presence or absence of a defect.

In one embodiment, the presence of a defect may be coded by a binary value (0=RAS: defect absent; 1=Defect: defect present). In each phase, a node, depending on its state as 'emitter node' or 'receiver node', may feed back one or two values. Specifically, in receiver mode, a node receives a signal only from one side at a time (from the neighboring emitter node) and is able to feed back a value to the server; in emitter mode, a node is able to receive signals in pulse-echo mode arriving from the left and from the right and feed back two values to the server.

In each phase (A to E), each node $N_0$ to $N_7$ sends, to the server, information about the state of the rail corresponding to the detection that it carries out on the segment covering its four neighboring nodes. The information is partial because the node does not know the state of the complete system (for example for a node in reception mode, it does not know whether or not the emission took place, for example).

All of the partial information is sent to the server for global processing. The supervision module is configured to combine the local information in order to perform a global diagnosis based on the local diagnoses, and to take into account the global state of the system.

In one embodiment, the server is configured to gather and post-process the results of the local detections of the nodes belonging to one and the same group or one and the same set, a set being defined as grouping together an emitter node and the left and right neighboring nodes receiving the signal from this emitter.

In the illustrated example, a group comprises 5 nodes composed of an emitter node $N_n$ and four neighboring receiving nodes ($N_{n+1}$, $N_{n+2}$, $N_{n-2}$). For an emitter node $N_n$, the global diagnostic method carried out by the supervisor at the level of the server (or, according to one variant embodiment, in a remote computing unit and coupled to the server) makes it possible to gather the information received (that is to say the values of the bits indicating the state of health 'RAS/Defect' of the segment covered) from the neighboring receiver nodes $N_{n+1}$, $N_{n+2}$, $N_{n-2}$, along with the right pulse-echo information $N_{nD}$ and left pulse-echo information $N_{nG}$ for the emitter node $N_n$.

The information received from a group of nodes for one and the same emission allows the supervisor to compose a group frame of multiple bits (that is to say of 6 bits in the example of 5 nodes).

Table (I) below illustrates the construction of a group frame of 6 bits from the information fed back by five nodes. The frame indicates that there is no defect on the segment going from the node $N_{n-2}$ to the node $N_n$, that is to say the values of $N_{n-2}$, $N_{n-1}$, $N_{nG}$ being at "0", and that there is a defect on the segment going from the node $N_n$ to the node $N_{n+2}$, that is to say the values of $N_{nD}$, $N_{n+1}$, $N_{n+2}$ being at "1".

| $N_{n-2}$ | $N_{n-1}$ | $N_{nG}$ | $N_{nD}$ | $N_{n+1}$ | $N_{n+2}$ |
|---|---|---|---|---|---|
| 0 | 0 | 0 | 1 | 1 | 1 |

In the case of data not present in the messages sent by the nodes to the supervisor, a '0' is placed in the frame at the corresponding position, but if the node is not known to be defective, a test procedure has to be carried out. Conversely, if a datum is present in a message fed back by a node when this node is listed as being defective, the state of the node has to be automatically validated in order to verify, using the global diagnostic procedure, that the data are not false, and then the state of the system may be updated.

To aggregate the information, the supervisor has to know, at all times, the position of each emitter node in the cycle.

However, to guarantee the stability of the system, it is important to use a single reference in order to prevent any desynchronization of the nodes (and risk having a situation for example in which 2 nodes might be emitters at the same time). In one embodiment, the chosen reference is the Unix time or Posix time, also called "Unix timestamp", which is a measure of time based on the number of seconds elapsed since Jan. 1, 1970 00:00:00 UTC, and corresponding to a 'date+time' information pair.

Advantageously, in order to guarantee that the supervisor does not mix up frames, even if multiple messages are sent at the same time during a communication, the 'date+time' data are included in the LoRa frames sent to the server, allowing said server to compute the position of each node for the analysis phase in question.

To determine the position of the emitter nodes, the supervisor knows:
- The firing time (t): it extracts, from the frame, for example the information '1596114000' corresponding to the date and time of Thursday Jul. 30, 2020 1:00 p.m.;
- The repetition period between each phase (A, B, C, etc.): for example 600 s, corresponding to one shot every 10 minutes; and
- The number of nodes per group: 5 in the chosen example.

The position of an emitter node is then computed by solving the following equation (1):

$$f(t) = \left\lfloor \frac{t}{600} \right\rfloor \% 5$$

where f is a function that will take integer values (that is to say from 0 to 4 for five phases) and where % denotes the modulo operator. A node will be identified as an emitter node when the value obtained by solving equation (1) modulo the number of nodes per group is equal to the integer value of the function f(t).

Table (II) below illustrates, for the chosen example of FIG. 5, the identification of the emitter nodes on the various firing phases, each row of the table corresponding to a phase A to E:

TABLE II

| Time | Timestamp | f(t) | $N_0$ 0% 5=0 | $N_1$ 1% 5=1 | $N_2$ 2% 5=2 | $N_3$ 3% 5=3 | $N_4$ 4% 5=4 | $N_5$ 5% 5=0 | $N_6$ 6% 5=1 | $N_7$ 7% 5=2 |
|---|---|---|---|---|---|---|---|---|---|---|
| 07/30/20 1:00 p.m. | 1596114000 | 0 | X | | | | | X | | |
| 07/30/20 1:10 p.m. | 1596114600 | 1 | | X | | | | | X | |
| 07/30/20 1:20 p.m. | 1596115200 | 2 | | | X | | | | | X |
| 07/30/20 1:30 p.m | 1596115800 | 3 | | | | X | | | | |
| 07/30/20 1:40 p.m. | 1596116400 | 4 | | | | | X | | | |

Thus, for the first firing phase A, initiated on Jul. 30, 2020 at 1:00 p.m., the value of the function f(t) is equal to '0'; solving equation (1) gives f(t)=0 for the nodes $N_0$ and $N_5$, which are then identified as being in the emitter position. For the second firing phase B, initiated on Jul. 30, 2020 at 1:10 p.m., the function f(t) has the value '1', and it is the nodes $N_1$ and $N_6$ that are identified in the emitter position. The method continues for each firing phase until the last firing phase E on Jul. 30, 2020 at 1:40 p.m., where the value of the function f(t) is equal to '4' and where solving equation (1) gives the node $N_4$ in the emitter position.

When all of the emitter nodes of a complete firing sequence are identified, the method then makes it possible to reallocate, to each other node of each group of nodes, its position as a receiver node with respect to the emitter node of the group to which it belongs. The method thus makes it possible to identify the 1st left receiver node, the 1st right receiver node, etc. depending on the number of nodes per group.

Based on the identification of the emitter and receiver nodes, the method makes it possible, for each phase, to allocate, to each node of a group of X nodes, a position bit value ranging from 1 to X+1 in order to designate the position of the node in a frame of X+1 bits. The emitter node is assigned two position bit values, one for its position as left node $N_{nG}$ and one for its position as right node $N_{nD}$. The left and right neighboring receiver nodes are each assigned a respective position bit value.

Returning to the example of FIG. 5, based on the identification table of the emitter nodes, the method makes it possible to assign the position bit values 3 and 4 to the node $N_0$ and to the node $N_5$ for the first phase, respectively the position bit values 5 and 6 to the right neighboring nodes $N_1$, $N_2$, and $N_6$, $N_7$, and respectively the position bit values 1 and 2 to the left neighboring nodes $N_3$, $N_4$.

Table (III) below illustrates, for the chosen example of FIG. 5, the position bit values of each node in a frame for each group, on the various firing phases, each row of the table corresponding to a phase A to E:

TABLE III

|   | $N_0$ | $N_1$ | $N_2$ | $N_3$ | $N_4$ | $N_5$ | $N_6$ | $N_7$ |
|---|---|---|---|---|---|---|---|---|
| A | 3 and 4 | 5 | 6 | 1 | 2 | 3 and 4 | 5 | 6 |
| B | 2 | 3 and 4 | 5 | 6 | 1 | 2 | 3 and 4 | 5 |
| C | 1 | 2 | 3 and 4 | 5 | 6 | 1 | 2 | 3 and 4 |
| D | 6 | 1 | 2 | 3 and 4 | 5 | 6 | 1 | 2 |
| E | 5 | 6 | 1 | 2 | 3 and 4 | 5 | 6 | 1 |

Based on the position of each node in the frame, the method carried out by the supervisor makes it possible to reconstruct the frames based on the local diagnostic information received by each node, and then to aggregate the data in order to determine the presence of defects.

However, in order to take into account what are known as exceptional cases, the method makes it possible to apply a correction mask to each reconstructed frame in order to ignore certain results such as the starts/ends of lines (non-existent node), nodes (emitter or receiver) known to be defective, for example. The frame correction step consists in applying a mask to a frame, said mask making it possible to ignore part of the frame (in the case of a defective receiver), or the whole frame (in the case of a defective or non-existent emitter at the start/end of a line).

In the case of the starts and ends of lines, certain nodes do not exist in a frame and applying a mask makes it possible to avoid an incorrect analysis. Advantageously, the method makes it possible to apply various masks depending on the position of an emitter node in a frame. Three cases are covered:

- The case where it is nodes in position $N_{-2}$ and $N_{-1}$ that are emitters: applying a mask is tantamount to ignoring the whole frame, since these nodes do not exist and therefore the nodes $N_0$ and N+1 are not able to receive a signal.
- The case where it is nodes in position $N_0$ that are emitters: applying a mask is tantamount to ignoring the nodes $N_{-1}$ and $N_{-2}$, which are not able to receive a signal since these nodes do not exist.
- The case where it is nodes in position $N_1$ that are emitters: applying a mask is tantamount to ignoring the node $N_{-1}$, which is not able to receive a signal since this node does not exist.
- Table (IV) below illustrates the application of a mask for a line start frame, depending on the position of the emitter node.

TABLE IV

| Emitter | $N_{-3}$ | $N_{-4}$ | $N_{-2}$ | $N_{-1}$ | $N_0$ | $N_1$ | $N_2$ | $N_3$ |
|---|---|---|---|---|---|---|---|---|
| $N_{-2}$ | 0 | 0 | 0 | 0 | 0 |   |   |   |
| $N_{-1}$ |   | 0 | 0 | 0 | 0 | 0 |   |   |
| $N_0$ |   |   | 0 | 0 | 1 | 1 | 1 |   |
| $N_1$ |   |   |   | 0 | 1 | 1 | 1 | 1 |

In the case of known defective nodes, the method makes it possible to apply a frame correction mask. Table (V) below illustrates one exemplary application of a correction mask for a firing sequence according to FIG. 5, in the case where the node $N_3$ is defective. For example, for phase A in which the node $N_5$ is an emitter, the mask applied is '01111' on the nodes of the group ($N_3$, $N_4$, $N_5$, $N_6$, $N_7$), invalidating the value fed back by the defective node $N_3$ and validating the values fed back by the nodes $N_4$ to $N_7$. For phase D, in which the node $N_3$ is an emitter, and by hypothesis known to be defective, the mask applied to the frame formed by the nodes $N_1$ to $N_5$ is '00000', invalidating all of the values fed back by these nodes. A person skilled in the art will understand that the examples are non-limiting and that any other mask configuration may be derived.

TABLE V

| sequence | $N_{-1}$ | $N_0$ | $N_1$ | $N_2$ | $N_3$ | $N_4$ | $N_5$ | $N_6$ | $N_7$ |
|---|---|---|---|---|---|---|---|---|---|
| A ($N_5$ emitter) |   |   |   |   | 0 | 1 | 1 | 1 | 1 |
| B ($N_1$ emitter) | 0 | 1 | 1 | 1 | 0 |   |   |   |   |
| C ($N_2$ emitter) |   | 1 | 1 | 1 | 0 | 1 |   |   |   |
| D ($N_3$ emitter) |   |   | 0 | 0 | 0 | 0 | 0 |   |   |
| E ($N_4$ emitter) |   |   |   | 1 | 0 | 1 | 1 | 1 |   |

The step of applying a frame correction mask is thus tantamount to an 'AND' logic operation between a value received from a node and the value defined for the node in the mask.

In a following step, the method takes into account the corrected frames to perform a global diagnosis in order to detect defects. A correspondence table is defined in order to associate each corrected frame with a possibility of identifying a defect. In the described example with 6-bit frames, the correspondence table comprises 64 values ($2^6$).

In one mode of implementation, the method makes it possible to carry out differentiated analysis for the sections to the right and the sections to the left of an emitter node.

Specifically, it seems acceptable to consider that the inspections to the left and to the right of an emitter are independent, although it is necessary to validate that the presence of a defect to the right of an emitter does not interact with receivers to the left due to echoes (especially for crack detection).

Thus, on a 6-bit frame, for the detection to the left of an emitter node, only the 3 left bits are taken into account for the analysis, that is to say the 3 most significant bits in the frame, and for the detection to the right, only the 3 right bits are taken into account for the analysis, that is to say the 3 least significant bits in the frame. This implementation is advantageous for reducing the number of possible cases by reducing the correspondence table to 16 values ($2^3+2^3$).

After the step of analyzing the corrected frames, the method makes it possible to generate a list of the inspection results to the right and to the left of each emitter node for each frame. The left/right inspection may be carried out through two binary operations combining the value of the corrected frame with the left analysis mask and with the right analysis mask:

Frame and left mask (111000) for the inspection to the left; and

Frame and right mask (000111) for the inspection to the right.

Tables (VI) and (VII) respectively illustrate all possible results of the inspection operations to the left and to the right for a 6-bit frame.

TABLE VI

Results of inspection to the left

| Frame & 111000 | Left analysis result |
|---|---|
| 000000 | Healthy |
| 001000 | Exception |
| 010000 | Exception |
| 011000 | Exception |
| 100000 | Defect between n − 1 and n − 2 |
| 101000 | Exception |
| 110000 | Exception |
| 111000 | Defect between n and n − 1 or 2 defects |

TABLE VII results of inspection to the right

| Frame & 000111 | Right analysis result |
|---|---|
| 000000 | Healthy |
| 000001 | Defect between n + 1 and n + 2 |
| 000010 | Exception |
| 000011 | Exception |
| 000100 | Exception |
| 000101 | Exception |
| 000110 | Exception |
| 000111 | Defect between n and n + 1 or 2 defects |

Some results raise an exception. Specifically, if an alert is raised for example by the node $N_n$ (emitter) and by the node $N_{n+2}$, the intermediate node $N_{n+1}$ should also detect the defect. Even though such exceptions do not necessarily signify failure of the node, they are special cases that require further investigation and validation, and which are therefore flagged in the analysis results.

Some exceptional cases may lead the user to carry out specific tests on the transducers in order to check the state of the system and update it if necessary.

Returning to the example of FIG. 5 and considering the emitter node $N_3$ during analysis to the right, the sections IV (between $N_3$ and $N_4$) and V (between $N_4$ and $N_5$) are inspected. The section IV is inspected by the nodes $N_3$, $N_4$ and $N_5$, and the section V is inspected only by the node $N_5$.

If the inspection to the right produces the following result: "Frame & 000111=000001", then the frame with the value 'XXX001' first makes it possible to determine, through the bit at '1' at the location of the node $N_5$, that there is a defect on the section V. In addition, this information provided by the node $N_5$ also signifies the presence of at least one defect on the section IV or on the section V. However, the information from the nodes $N_3$ and $N_4$ being at '0' implies that there is no defect in the area IV.

If the inspection to the right produces the following result: "Frame & 000111=000010", then the frame with the value 'XXX010' has to raise an exception. Specifically, the node $N_4$ indicates, through the value of the bit at '1', the presence of a defect on the section IV, while the nodes $N_3$ and $N_5$ the value of which is '0' contradict this information.

A result indicating an exception should trigger an additional test procedure in order to clarify this detection. In the event of complete fracture of the rail, this exceptional case is necessarily synonymous with failure. Specifically, if the node $N_4$ no longer receives a signal, then the node $N_5$ is not able to receive a signal, and the information of the bit at '0' is contradictory. Advantageously, the method of the invention makes it possible to identify exceptional cases by aggregating data, and thus reveal cases of failure. Ultimately, during crack detection, a defect may be detected by one node but not by the others depending on various parameters such as proximity, interaction, etc.

If the inspection to the right produces the following result: "Frame & 000111=000011", then the frame with the value 'XXX011' has to raise an exception. Specifically, according to the frame, there is at least one defect on the section IV through the value of the bit at '1' at the position of the node $N_4$, and there may be another defect on the section V. However, the node $N_3$ does not detect a defect since its bit value is at '0'. An exception should therefore be raised. One cause of this state may be the pulse-echo configuration of the node $N_3$ that does not detect remote problems, and a fracture signifies, in pulse-echo mode, an increase in amplitude and not disappearance of the signal, the detection algorithm may lack sensitivity starting from a certain distance.

In the same way, the other results may be analyzed to the left and to the right for defect detection.

Two other examples of defect detection according to the principles of the invention based on FIG. 5 are described, considering, for the first example, the existence of a fracture on the section III between the nodes $N_2$ and $N_3$ and, for the second example, the existence of a fracture on the section III with the node $N_3$ that is defective. In each case, the various phases, except for phase A that does not inspect this portion, are shown.

First Case: Rail Fracture Between the Nodes $N_2$ and $N_3$.

[Table 8] Table (VIII) shows, on each row corresponding to a firing phase (A-E), the values received by the supervisor for each node ($N_0$ to $N_7$). In this case, with no node being defective, the correction mask has the value '111111', and therefore does not change the result of the received frames.

TABLE VIII

| | N₀ | N₁ | N₂ | N₃ | N₄ | N₅ | N₆ | N₇ |
|---|---|---|---|---|---|---|---|---|
| A | 0 0 | | 0 | 0 | 0 | 0 | 0 0 | 0 | 0 |
| B | 0 | 0 0 | 0 | 1 | 0 | 0 | 0 0 | 0 |
| C | 0 | | 0 0 1 | 1 | 0 | 0 | 0 | 0 0 |
| D | 0 | 1 | 1 | 1 0 | 0 | 0 | 0 | 0 |
| E | 0 | 0 | 1 | 0 | 0 0 | 0 | 0 | 0 |

In the table, it is possible to see that the frames carrying information about the presence of a defect are:

The frame associated with $N_1$ in sequence B, which has the value '000001': In this case, the inspection to the left produces the result "000001 & 111000=000000", signifying that the rail to the left of the node is healthy, and the inspection to the right produces the result "000001 & 000111=000001", signifying that there is a defect between the nodes $N_2$ and $N_3$.

The frame associated with $N_2$ in sequence C, which has the value '000111': in this case, the inspection to the left produces the result "000111 & 111000=000000", signifying that the rail to the left of the node is healthy, and the inspection to the right produces the result "000111 & 000111=000111", signifying that there is at least one defect between the nodes $N_2$ and $N_3$.

The other two frames associated with $N_3$ and $N_4$ in sequences D and E are frames symmetrical to the frames associated with $N_1$ and $N_2$, the detection then being performed to the right rather than the left.

Second Case: Rail Fracture Between the Nodes $N_2$ and $N_3$ and Defective Node $N_3$.

Table (IX) shows, on each row corresponding to a firing phase (A-E), the values received by the supervisor for each node ($N_0$ to $N_7$).

TABLE IX

| | N₀ | N₁ | N₂ | N₃ | N₄ | N₅ | N₆ | N₇ |
|---|---|---|---|---|---|---|---|---|
| A | 0 0 | | 0 | 0 | 0 | 0 | 0 0 | 0 | 0 |
| B | 0 | 0 0 | 0 | X | 0 | 0 | 0 0 | 0 |
| C | 0 | | 0 0 1 | X | 1 | 0 | 0 | 0 0 |
| D | 0 | 1 | 1 | X X | 1 | 1 | 0 | 0 |
| E | 0 | 0 | 1 | X | 0 0 | 0 | 0 | 0 |

In this case, with the node $N_3$ being defective, a correction mask will be applied to the frames in order to take the failure of the node into account. The correction masks that are applied are then:

'011110' for the frame associated with the node $N_1$ in sequence B, in which the first '0' comes from the edge of the track and the last '0' to take into account the defective node $N_3$.

'111101' for the frame associated with the node $N_2$ in sequence C.

'000000' for the frame associated with the node $N_3$ in sequence D, since, with the node $N_3$ being defective, it does not emit and no result is valid in this case.

'101111' for the frame of the node $N_4$ in sequence E.

Applying the correction masks gives the following table (X):

TABLE X

| | N₀ | N₁ | N₂ | N₃ | N₄ | N₅ | N₆ | N₇ |
|---|---|---|---|---|---|---|---|---|
| A | 0 0 | | 0 | 0 | 0 | 0 | 0 0 | 0 | 0 |
| B | 0 | 0 0 | 0 | 0 | 0 | 0 | 0 0 | 0 |
| C | 0 | | 0 0 1 | 0 | 1 | 0 | 0 | 0 0 |
| D | 0 | 0 | 0 | 0 0 | 0 | 0 | 0 | 0 |
| E | 0 | 0 | 1 | 0 | 0 0 | 0 | 0 | 0 |

The left/right defect analysis is carried out on the corrected frames, and produces the following results:

For the frame associated with the node $N_1$ in sequence B, which has the value '000000', the result of the inspection to the left is "000000 & 111000=000000", which signifies that the rail (or section) to the left of the node is healthy, and the result of the inspection to the right is "000000 & 000111=000000", which signifies that the rail (or section) to the right of the node is healthy.

For the frame associated with the node $N_2$ in sequence C, which has the value '000101', the result of the inspection to the left is "000101 & 111000=000000", which signifies that the rail (or section) to the left of the node is healthy, and the result of the inspection to the right is "000101 & 000111=000101", which signifies that there is at least one defect between the node $N_2$ and the node $N_3$, but also reveals an exception, which is a known failure in the described case.

For the frame associated with the node $N_3$ in sequence D, which has the value '000000', no defect detection needs to be carried out since the emitter node $N_3$ is known to be defective.

For the frame associated with the node $N_4$ in sequence E, which has the value '100000', the result of the inspection to the left is "100000 & 111000=100000", which signifies that there is at least one defect between the node $N_2$ and the node $N_3$, and the result of the inspection to the right is "100000 & 000111=000000", signifying that there is no defect on the right.

The few examples chosen to describe the principles of the invention are non-limiting and may be applied generally, but they make it possible to demonstrate the advantage of the method of the invention in terms of having inspection redundancy. Specifically, in the examples, it becomes apparent that the failure of the node $N_3$ does not prevent the defect from being detected.

In one variant embodiment taken as another example to describe the method of the invention, the configuration of the system comprises one emitter node out of three in order to avoid any signal overlap. A firing sequence based on which a global defect diagnosis is carried out is illustrated in simplified form in FIG. 6, with, in a first phase A, the nodes $N_2$ and $N_5$ as emitter nodes, the signal emitted by an emitter node being received by a single neighbor on the left and a single neighbor on the right. Thus, the signal emitted by the node $N_2$ is received on the left by the node $N_1$ and on the right by the node $N_3$, and the signal emitted by the node $N_5$ is received on the left by the node $N_4$ and on the right by the node $N_6$.

Figure 7:
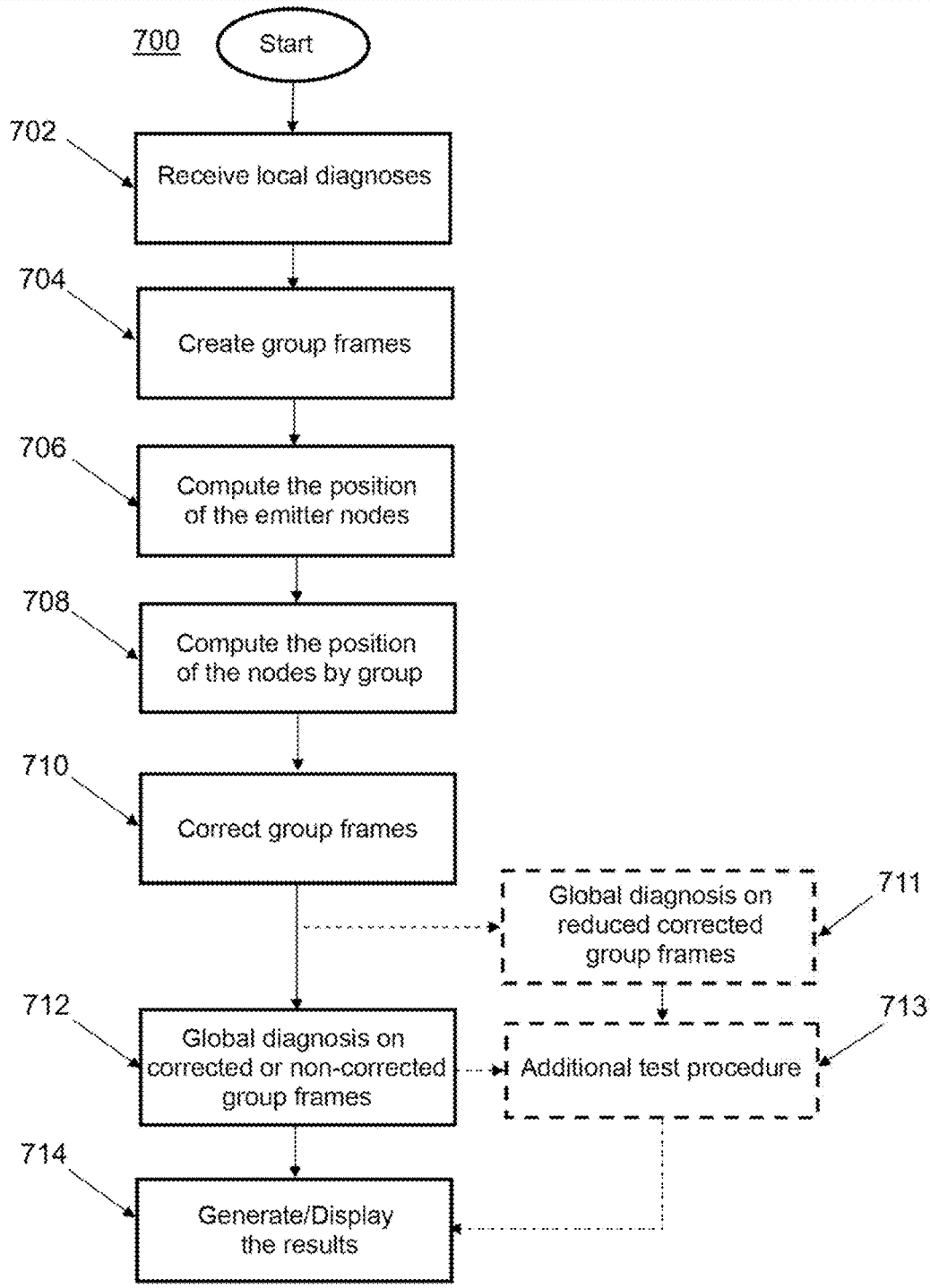
FIG. 7 illustrates a flowchart of the general steps of the method of the invention in one embodiment.

The analysis principle is identical to that described for the example of FIG. 5, and the general steps of the method are illustrated in the flowchart of FIG. 7.

The method 700 begins after a data acquisition time 702 allowing the server to receive the messages of the local diagnoses carried out by the electronic nodes. The acquisition time may be fixed and predefined or settable by the user. According to the example of FIG. 6, the acquisition time is chosen so that the analysis cycle covers the reception of messages corresponding to three firing phases A, B, C.

In a following step 704, the method makes it possible to create group frames based on the information received by each node. According to the example of FIG. 6, frames are created for the group of nodes ($N_1$, $N_2$, $N_3$) and for the group of nodes ($N_4$, $N_5$, $N_6$). The content of a frame of a group, that is to say the value of the bits '0' or '1', corresponds to the local diagnosis fed back by the emitter node of said group.

Figure 6:
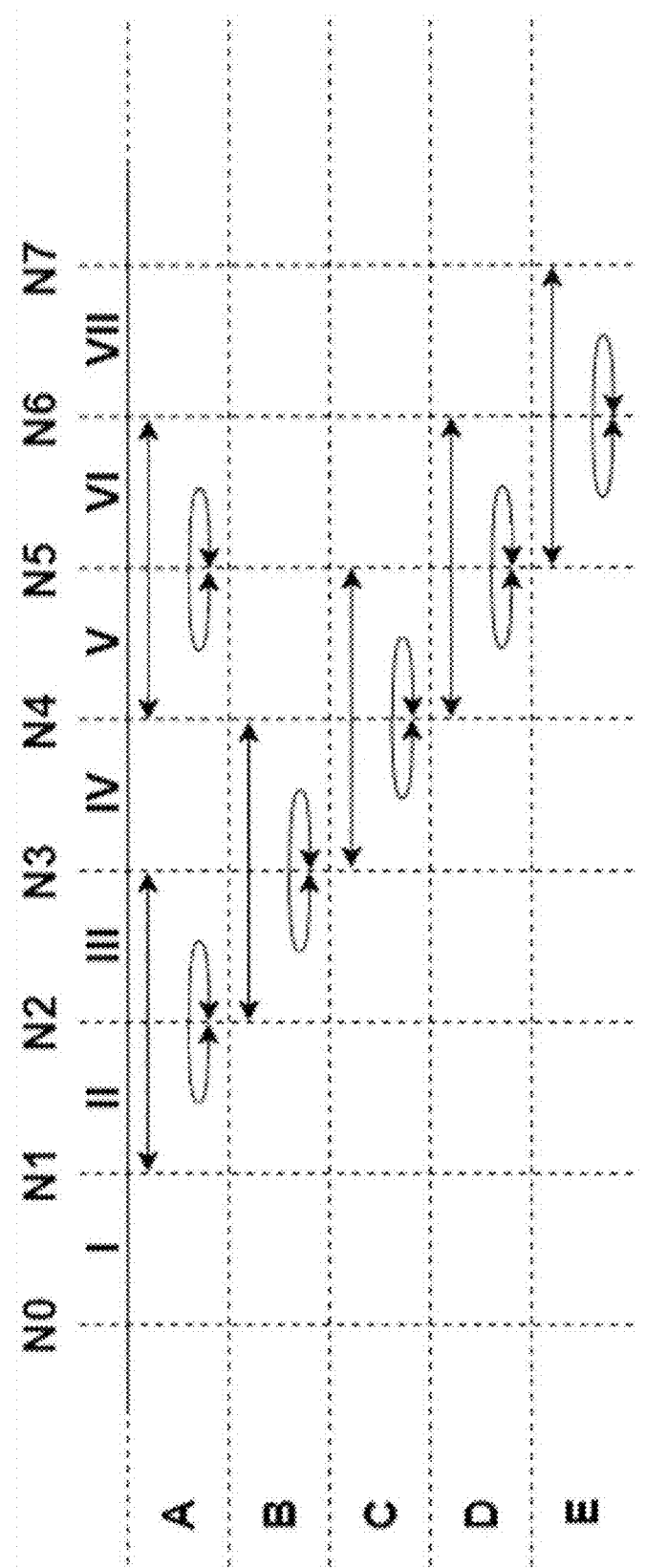
FIG. 6 illustrates another firing sequence allowing LoRa messages to be processed by the remote server.

Table (XI) illustrates one example of a 4-bit frame created for a group of 3 nodes ($N_{n-1}$, $N_n$, $N_{n+1}$) according to the example of FIG. 6:

TABLE XI

| $N_{n-1}$ | $N_{nG}$ | $N_{nD}$ | $N_{n+1}$ |
|---|---|---|---|
| 0 | 0 | 1 | 1 |

In a following step 706, the method makes it possible to compute the position of the emitter nodes for each phase.

Table (XII) illustrates, for the example of FIG. 6, the position of the emitter nodes on each phase, computed using equation (1):

TABLE XII

| Time | Timestamp | f(t) | $N_0$ 0% 3=0 | $N_1$ 1% 3=1 | $N_2$ 2% 3=2 | $N_3$ 3% 3=0 | $N_4$ 4% 3=1 | $N_5$ 5% 3=2 | $N_6$ 6% 3=0 | $N_7$ 7% 3=1 |
|---|---|---|---|---|---|---|---|---|---|---|
| 07/30/20 1:00 p.m. | 1596114000 | 0 | X | | | X | | | X | |
| 07/30/20 1:10 p.m. | 1596114600 | 1 | | X | | | X | | | X |
| 07/30/20 1:20 p.m. | 1596115200 | 2 | | | X | | | X | | |
| 07/30/20 1:30 p.m. | 1596115800 | 0 | X | | | X | | | X | |
| 07/30/20 1:40 p.m. | 1596116400 | 1 | | X | | | X | | | X |

Thus, for the first firing phase A, initiated on Jul. 30, 2020 at 1:00 p.m., the value of the function f(t) is equal to '0'; solving equation (1) gives f(t)=0 for the nodes $N_0$, $N_3$ and $N_6$, which are then identified as being in the emitter position. For the second firing phase B, initiated on Jul. 30, 2020 at 1:10 p.m., the function f(t) has the value '1', and it is the nodes $N_1$, $N_4$ and $N_7$ that are identified in the emitter position. For the third firing phase C, initiated on Jul. 30, 2020 at 1:20 p.m., the function f(t) has the value '2', and it is the nodes $N_2$ and $N_5$ that are identified in the emitter position.

The method makes it possible, in a following step 708, to identify the left and right neighboring receiver nodes of each emitter node, and to compute a position bit value indicating the position of each node in each group frame and for each phase of the analysis cycle.

Table (XIII) illustrates, for the example of FIG. 6, the position of each node in each group frame, on the various firing phases, indicated by position bit values:

TABLE XIII

| | $N_0$ | $N_1$ | $N_2$ | $N_3$ | $N_4$ | $N_5$ | $N_6$ | $N_7$ |
|---|---|---|---|---|---|---|---|---|
| A | 2 and 3 | 4 | 1 | 2 and 3 | 4 | 1 | 2 and 3 | 4 |
| B | 1 | 2 and 3 | 4 | 1 | 2 and 3 | 4 | 1 | 2 and 3 |
| C | 4 | 1 | 2 and 3 | 4 | 1 | 2 and 3 | 4 | 1 |
| D | 2 and 3 | 4 | 1 | 2 and 3 | 4 | 1 | 2 and 3 | 4 |
| E | 1 | 2 and 3 | 4 | 1 | 2 and 3 | 4 | 1 | 2 and 3 |

Thus, for the first firing phase A, the nodes $N_0$, $N_3$ and $N_6$, identified as emitter nodes, have position bit values of 2 and 3; the nodes $N_2$ and $N_5$, identified as right receiver nodes, have a position bit value equal to 1; the nodes $N_1$, $N_4$ and $N_7$, identified as left receiver nodes, have a position bit value equal to 4.

In a following step 710, the method makes it possible to correct the content of certain group frames, that is to say modify or ignore bit values in order to take into account the starts and ends of lines and any node failures already known in the group frames containing affected nodes.

Tables (XIV) and (XV) illustrate, for the example of FIG. 6, respectively, a group frame correction mask for managing domain edges (start/end of track: nodes $N_{-2}$ and $N_{-1}$ nonexistent), and a correction mask for defective nodes (here the node $N_3$).

TABLE XIV

| Emitter | $N_{-2}$ | $N_{-1}$ | $N_0$ | $N_1$ |
|---|---|---|---|---|
| $N_{-1}$ | 0 | 0 | 0 | |
| $N_0$ | | 0 | 1 | 1 |

TABLE XV

| Sequence | $N_1$ | $N_2$ | $N_3$ | $N_4$ | $N_5$ |
|---|---|---|---|---|---|
| A ($N_2$) | 1 | 1 | 0 | | |
| B ($N_3$) | | 0 | 0 | 0 | |
| C ($N_4$) | | | 0 | 1 | 1 |
| D ($N_2$) | 1 | 1 | 0 | | |
| E ($N_3$) | | 0 | 0 | 0 | |

In a following step 712, the method makes it possible, based on the corrected group frames and the positions of the nodes in each group, to generate a global diagnosis result with regard to the existence or absence of a defect. The result of the global diagnosis lists, for each group of nodes in each phase, a value representative of the state of each node of the group for each phase, making it possible to determine whether the node is healthy or defective or whether it raises an exception.

In an optional step 711, the method makes it possible to carry out a reduced inspection of the frames through a separate inspection of the left and right sections of an emitter node, by combining the sequence of bits of the corrected frame with a sequence comprising only most significant bits for the inspection to the left, and by combining the sequence of bits of the corrected frame with a sequence comprising only least significant bits for the inspection to the right.

Tables (XVI) and (XVII) illustrate, for the example of FIG. 6, respectively, the results of the inspection to the left and to the right, in which the complete analysis table with 16 values ($2^4$) is reduced to the analysis of 8 values, 4 for the left inspection and 4 for the right inspection.

TABLE XVI

| Frame & 1100 | Left analysis results |
|---|---|
| 0000 | Healthy |
| 0100 | Exception |
| 1000 | Exception |
| 1100 | Defect between n and n − 1 |

TABLE XVII

| Frame & 0011 | Right analysis results |
|---|---|
| 0000 | Healthy |
| 0001 | Exception |
| 0010 | Exception |
| 0011 | Defect between n and n + 1 |

Based on the results of the analysis, be these obtained after analysis of all of the binary combinations resulting from the corrected frames or be these obtained on a reduced subset of the binary combinations through a differentiated left/right inspection, the user is able to determine the healthy nodes (that is to say '0000'), the nodes that raise an exception (that is to say '0100'; '1000'; '0001'; '0010') and the nodes that reveal a defect in their intersection (that is to say '1100'; '0011').

In an optional step 713, for nodes analyzed as being defective or an exception, the method is configured to trigger an additional test procedure aimed at determining whether the failure stems from one of the nodes of the intersection or from a failure of the communication protocol. When the test procedure is complete, a signal may be sent to the supervisor to update the state of the network and the correction masks to be applied.

In an additional step 714, the results of the analysis are generated and displayed on an HMI interface in a form able to be used directly by the user, visually indicating, on a map of the track for example, the location of the one or more defects, or in any other form suitable for the application.

In various embodiments, the method makes it possible to send an alert to train drivers and/or to any traffic control system. The method may also be adapted to issue, to a train entering the track on which a potential defect has been detected, a braking command that is triggered according to the result of the analysis.

The invention may be implemented on the basis of hardware and/or software elements. It may be available as a computer program product on a computer-readable medium. The medium may be electronic, magnetic, optical or electromagnetic. The computing means or resources may be centralized and/or be distributed ("Cloud computing"), optionally with or according to peer-to-peer and/or virtualization and/or redundancy technologies. The software code may be executed on any suitable processor (for example a microprocessor) or processor core or set of processors, be these provided in a single computing device or distributed between several computing devices. The computing implementation of the invention may use centralized (for example client-server or master-slave) systems and/or distributed systems (for example a peer-to-peer architecture using accessible computing resources, possibly opportunistically, for example ad hoc networks, etc.). The system (or its variants) implementing one or more of the steps of the method may use one or more dedicated electronic circuits or a general-purpose circuit. The method may also be implemented on a reprogrammable computing machine (a processor or a microcontroller, for example) executing a program comprising a sequence of instructions, or on a dedicated computing machine (for example a set of logic gates such as an FPGA or an ASIC, or any other hardware module). A dedicated circuit may notably improve performance. The reference to a computer program that, when executed, performs any one of the functions described above is not limited to an application program running on a single host computer. On the contrary, the terms computer program and software are used here in a general sense to refer to any type of computer code (for example application software, firmware, microcode, APIs, web services, or any other form of computer instruction) that may be used to program one or more processors to implement the steps of the method.

The invention claimed is:

1. A method for detecting defects in an elongated structure having a plurality of transducers configured to emit control guided elastic waves in the elongated structure and to acquire measurement signals of characteristic quantities of elastic waves propagating in the structure, each transducer of the plurality of transducers being coupled to a respective electronic device of a set of electronic devices installed along the structure, wherein the set of electronic devices installed along the structure constitute a network of nodes, each node of the network of nodes being configured to process measurement signals received from at least one transducer of the plurality of transducers, the method being computer-implemented and comprising for a firing sequence of multiple elastic waves emission phases, the following steps:
  performing a plurality of local defect diagnoses, based on measurement signals received by a plurality of electronic devices, for multiple elastic wave emission phases, each local defect diagnosis carried by a node gathering information received by said node from one or several neighboring emitter nodes and right and left pulse-echo information;
  transmitting, to a remote server in accordance with a low-energy-consumption communication protocol, messages containing information relating to each local diagnosis, said messages being formatted in accordance with said low-energy-consumption communication protocol; and
  at the remote server, steps of:
    identifying a position of each emitter node for each elastic wave emission phase;
    creating node group frames including a group, being defined as comprising an emitter node and left and right neighboring nodes, which receive a signal from the emitter node, and a frame, containing for each emitter node in a group, binary information representative of the information received for the corresponding emitter node;
    determining for each node group frame, a position of each left or right neighboring node, relative to the identified position of the emitter node;
    aggregating the local diagnostic information contained in said received messages with the position of each node determined for the firing sequence; and
    determining the presence or absence of a defect in said elongated structure.

2. The method as claimed in claim 1, wherein each electronic device comprises a signal processing circuit, and wherein the step of performing a plurality of local defect diagnoses further comprises in each signal processing circuit implementing a defect detection algorithm in order to generate a local diagnosis of the plurality of local defect diagnoses.

3. The method as claimed in claim 1, wherein the transmission step consists in transmitting messages between the plurality of electronic devices and the remote server in accordance with the low-energy-consumption communication protocol being a Low-Power Wide Area Network (LP-WAN) protocol.

4. The method as claimed in claim 1, wherein the transmission step consists in transmitting messages in the LoRa format in accordance with the low-energy-consumption communication protocol being a Long Range Wide Area Network (LoRaWan) communication protocol.

5. The method as claimed in claim 1, wherein the transmission step consists in transmitting messages containing at least one binary information item on the presence or absence of a defect.

6. The method as claimed in claim 1, wherein the creating node group frames step comprises steps of:
  creating the node group frames, wherein the group further comprises grouping together n nodes of the network of nodes composed of the emitter node and n−1 receiver nodes, a group frame having a number n+1 of bits, the value of n−1 bits corresponding to local diagnostic information received from a receiver node, and the value of two bits corresponding to left and right pulse-echo local diagnostic information received from the emitter node; and
  computing, for each group frame and for each phase, a position for each node as an emitter node position or a receiver node position.

7. The method as claimed in claim 6, further comprising a step of correcting content of at least one of the group frames.

8. The method as claimed in claim 6, wherein the step of determining the presence or absence of a defect consists, based on the corrected or non-corrected group frames and on the positions of the nodes in each group, in generating a global diagnosis result that lists, for each group of nodes in each phase, a value representative of the state of each node of the group for each phase, making it possible to determine whether the node is healthy or defective or whether it raises an exception.

9. The method as claimed in claim 1, further comprising a step of determining the location or the severity of a defect in the event of the presence of a defect being determined.

10. The method as claimed in claim 1, further comprising a step of displaying the result of the global defect diagnosis.

11. A computer program product, said computer program comprising code instructions for performing the steps of the method as claimed in claim 1 when said program is executed on a computer.

12. A device for detecting defects in an elongated structure configured to act as an elastic-wave waveguide, said elongated structure being fitted with a plurality of transducers configured to emit control guided elastic waves in the elongated structure and to acquire measurement signals of characteristic quantities of elastic waves propagating in said elongated structure, each transducer being coupled to an electronic device, the set of electronic devices constituting a network of nodes configured to process measurement signals received from at least one transducer, the defect detection device comprising means for implementing the steps of the method as claimed in claim 1.

13. The defect detection device as claimed in claim 12, wherein each electronic device of the set of electronic devices comprises:
  an energy source; an elastic wave measurement circuit; an elastic wave emission circuit; storage components; a signal processing circuit; a wireless communication circuit coupled to an antenna in order to send messages in accordance with the low-energy-consumption communication protocol; a Global Navigation Satellite System (GNSS) receiver.

14. A system for monitoring the state of railway tracks based on the analysis of elastic waves guided in the rails, the system comprising a plurality of defect detection devices as claimed in claim 12.

* * * * *